United States Patent
Morimoto et al.

(10) Patent No.: US 7,813,240 B2
(45) Date of Patent: Oct. 12, 2010

(54) OPTICAL DISK RECORDING APPARATUS AND OPTICAL RECORDING METHOD

(75) Inventors: Tadatsugu Morimoto, Kanagawa (JP); Takashi Fujimoto, Chiba (JP); Yoshie Hayashida, Kagoshima (JP); Rumi Fukuda, Kagoshima (JP); Jumpei Kura, Kanagawa (JP); Takeshi Yuwaki, Kagoshima (JP)

(73) Assignee: Sony Corporation, Tokyo (JP)

( * ) Notice: Subject to any disclaimer, the term of this patent is extended or adjusted under 35 U.S.C. 154(b) by 700 days.

(21) Appl. No.: 11/565,722

(22) Filed: Dec. 1, 2006

(65) Prior Publication Data
US 2007/0127335 A1    Jun. 7, 2007

(30) Foreign Application Priority Data
Dec. 2, 2005    (JP)    ............ P2005-349362

(51) Int. Cl.
G11B 5/00      (2006.01)
G11B 7/12      (2006.01)
G11B 15/52     (2006.01)
G11B 7/00      (2006.01)

(52) U.S. Cl. .............. 369/47.53; 369/116; 369/44.29; 369/47.5

(58) Field of Classification Search .......... 369/47.5, 369/116, 44.29
See application file for complete search history.

(56) References Cited
U.S. PATENT DOCUMENTS

2001/0038586 A1*  11/2001  Gushima et al. ......... 369/47.35
2002/0186633 A1*  12/2002  Kai et al. .............. 369/47.51
2005/0036415 A1    2/2005  Yoshida et al.
2006/0245336 A1*  11/2006  Yokoi et al. ........... 369/116

FOREIGN PATENT DOCUMENTS

| JP | 2000-339737 | 12/2000 |
|---|---|---|
| JP | 2002-237046 | 8/2002 |
| JP | 2003-077149 | 3/2003 |
| JP | 2004-213808 | 7/2004 |
| JP | 2004-246934 | 9/2004 |
| JP | 2005-063476 | 3/2006 |

* cited by examiner

Primary Examiner—Joseph H Feild
Assistant Examiner—Nicholas Lee
(74) Attorney, Agent, or Firm—Sonnenschein Nath & Rosenthal LLP

(57) ABSTRACT

An optical disk recording apparatus having (1) an optical pickup that emits laser light to illuminate a recording surface of an optical disk, receives reflected light resulting from the laser light reflected off the recording surface, and generates a light reception signal based on the thus received reflected light; (2) a laser power controller that sets a laser power setting and controls the power of the laser light emitted from the optical pickup based on the thus set laser power setting; and (3) a signal generator that, when a plurality of trial write areas provided on the recording surface of the optical disk are successively illuminated with the laser light in order to write trial write data, generates a timing notification signal that sets laser arrival timing when the laser light sequentially reaches trial write start positions of the plurality of trial write areas based on the light reception signal generated by the optical pickup.

3 Claims, 4 Drawing Sheets

CIRCUIT CONFIGURATION OF OPTICAL RECORDING VIDEO
CAMCORDER ACCORDING TO EMBODIMENT OF INVENTION

CONFIGURATION OF OPTICAL PICKUP

CONFIGURATION OF OPTICAL DISK

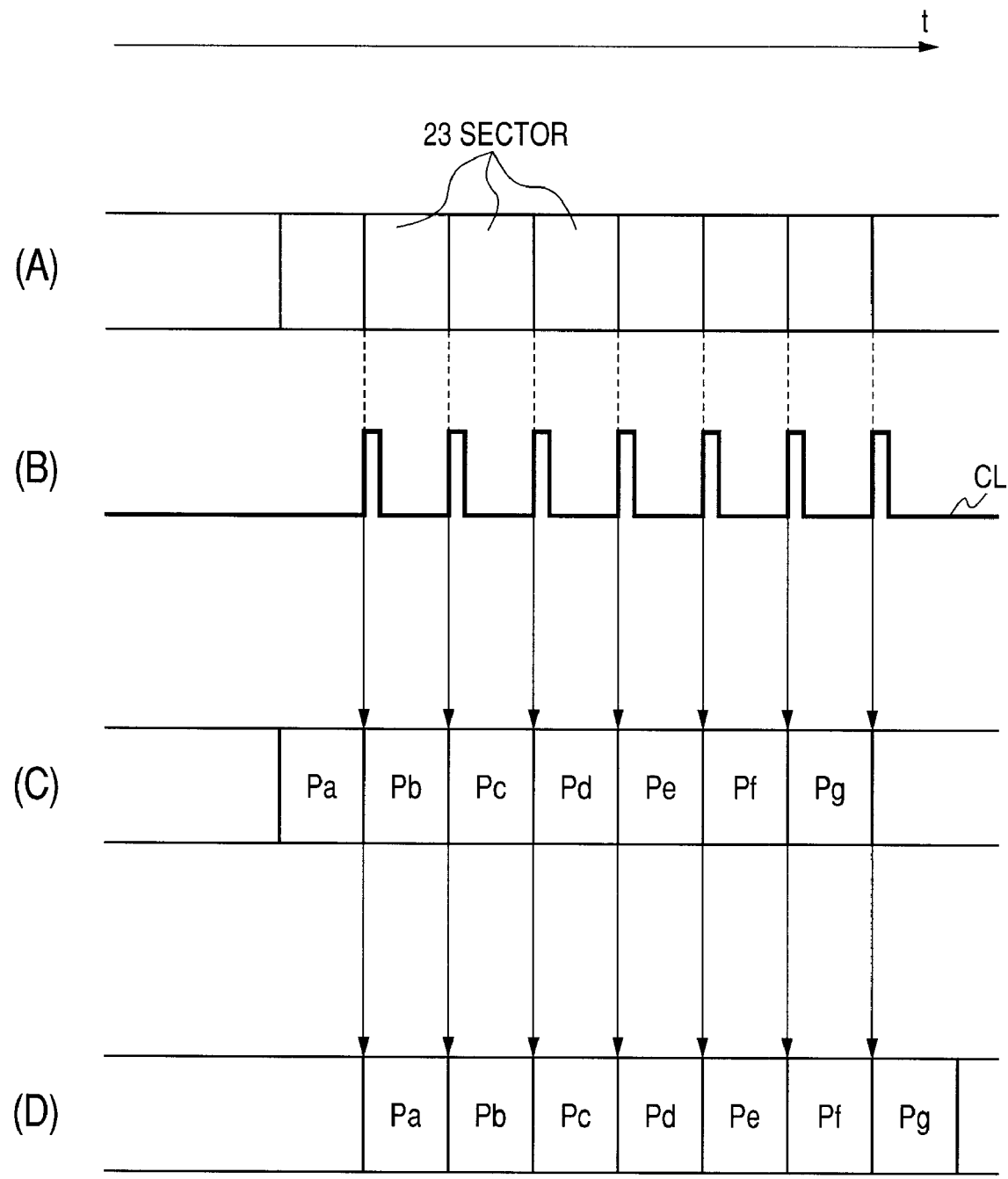

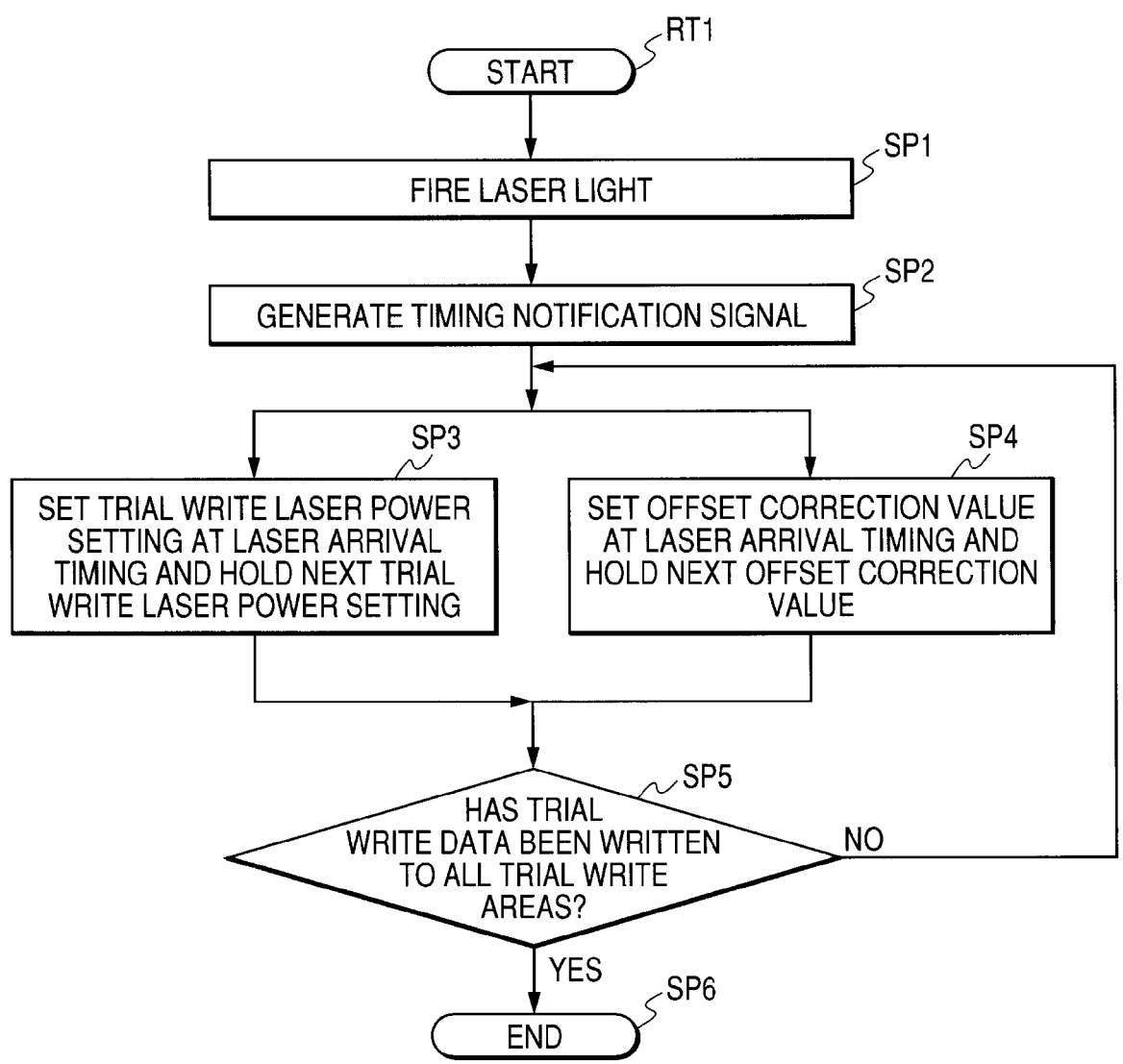

OPTICAL DISK RECORDING APPARATUS AND OPTICAL RECORDING METHOD

CROSS REFERENCES TO RELATED APPLICATIONS

The present invention contains subject matter related to Japanese Patent Application JP 2005-349362 filed in the Japanese Patent Office on Dec. 2, 2005, the entire contents of which being incorporated herein by reference.

BACKGROUND OF THE INVENTION

1. Field of the Invention

The present invention relates to an optical disk recording apparatus and an optical recording method, which are suitably applied to, for example, an optical recording video camcorder that records and reproduces data to and from an optical disk.

2. Description of the Related Art

In an optical disk recording apparatus of related art, when an optical disk is placed and rotated in the apparatus body, trial write data is written to a plurality of successive trial write areas provided on the recording surface of the optical disk by illuminating the trial write areas with laser light of respective different powers. Then, the optical disk recording apparatus reproduces the trial write data from the plurality of trial write areas on the optical disk and, based on the reproduced results, performs an optimum laser light power selection process, called OPC (Optimum Power Control), in which an optimum laser light power during data recording is determined (see JP-A-2004-213808, for example).

SUMMARY OF THE INVENTION

In the optical disk recording apparatus thus configured, whenever the laser light reaches a trial write start position of each of the trial write areas on the optical disk, a controller detects that the laser light has reached the trial write start position. When the controller of the optical disk recording apparatus detects that the laser light has reached the trial write start position, the controller sends and sets a trial write laser power setting, indicative of the value of the laser light power for writing the trial write data, to a laser power controller and drives the laser power controller to control the laser light power based on the thus set trial write laser power setting.

However, when the controller in the optical disk recording apparatus carries out this optimum laser light power selection process, the controller also performs other processes. Therefore, an increased process load on the controller causes, for example, time difference between the detection of the laser light arrival at the trial write start position and the sending and setting of the trial write laser power setting to the laser power controller, so that the timing of detecting the laser light arrival at the trial write start position may not be synchronized with the timing of switching the laser light power. Accordingly, the optical disk recording apparatus has a problem in that the actual trial write start position is shifted from the trial write start position of each of the trial write areas on the optical disk, so that the trial write areas is not effectively utilized when the trial write data is written.

The invention has been made in view of the above circumstances and it is desirable to provide an optical disk recording apparatus and an optical recording method that can effectively use each trial write area to write trial write data.

According to an embodiment of the invention, there is provided an optical disk recording apparatus that includes an optical pickup that emits laser light to illuminate a recording surface of an optical disk, receives reflected light resulting from the laser light reflected off the recording surface, and generates a light reception signal based on the thus received reflected light. When the optical pickup is used to successively illuminate a plurality of trial write areas provided on the recording surface of the optical disk with the laser light in order to write trial write data, a signal generator generates a timing notification signal that notifies laser arrival timing when the laser light sequentially reaches trial write start positions of the plurality of trial write areas based on the light reception signal generated by the optical pickup. When the laser arrival timing is notified by the timing notification signal, a laser power controller switches and sets the laser power setting held in the laser power controller itself, and controls the power of the laser light emitted from the optical pickup based on the thus set laser power setting.

Accordingly, in the embodiment of the invention, the laser power setting is switched and set at the laser arrival timing when the laser light sequentially reaches trial write start positions of the plurality of trial write areas provided on the recording surface of the optical disk and the power of the laser light emitted from the optical pickup is controlled based on the thus set laser power setting, so that at the laser arrival timing when the laser light reaches each of the trial write start positions of the plurality of trial write areas, the power of the laser light can be switched to the power corresponding to the trial write area at the trial write start position in order to write the trial write data to the trial write area.

According to an embodiment of the invention, an optical pickup is used to emit laser light to illuminate a recording surface of an optical disk, receive reflected light resulting from the laser light reflected off the recording surface, and generate a light reception signal based on the thus received reflected light. When a plurality of trial write areas provided on the recording surface of the optical disk are successively illuminated with the laser light in order to write trial write data, a signal generator generates a timing notification signal that notifies laser arrival timing when the laser light sequentially reaches trial write start positions of the plurality of trial write areas based on the light reception signal generated by the optical pickup. When the laser arrival timing is notified by the timing notification signal, a laser power controller switches and sets the laser power setting held in the laser power controller itself, and controls the power of the laser light emitted from the optical pickup based on the thus set laser power setting. Therefore, the power of the laser light is switched to the power corresponding to the trial write area at the trial write start position at the laser arrival timing when the laser light reaches each of the trial write start positions of the plurality of trial write areas, allowing the trial write data to be written to the trial write area. Accordingly, there are provided an optical disk recording apparatus and an optical recording method that can effectively use each of the trial write areas to write the trial write data.

BRIEF DESCRIPTION OF THE DRAWINGS

FIG. 4 shows timing charts for explaining how to set a trial write laser power setting; and FIG. 5 is a flow chart showing a trial write process procedure.

DESCRIPTION OF THE PREFERRED EMBODIMENTS

An embodiment of the invention will be described below in detail with reference to the drawings.

Figure 1:
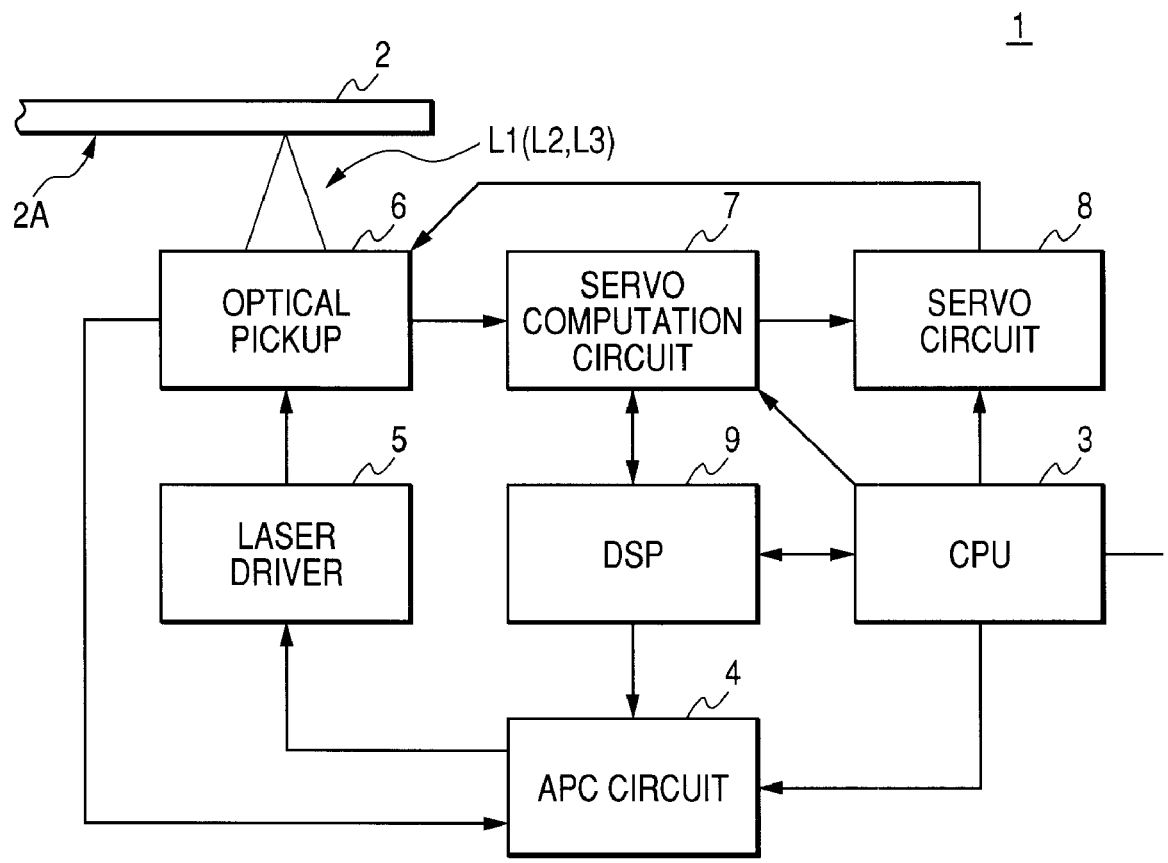
FIG. 1 is a block diagram showing one embodiment of the configuration of the optical recording video camcorder according to an embodiment of the invention.

FIG. 1 is a block diagram generally illustrating the configuration of an optical recording video camcorder 1 to which the invention is applied. In the optical recording video camcorder 1, when an optical disk 2, such as a writable DVD (Digital Versatile Disk), is placed in the body, a central processing unit 3 reads out various programs pre-stored in a memory (not shown) and executes them to provide centralized control over the entire optical recording video camcorder 1 and carry out various processes.

Figure 2:
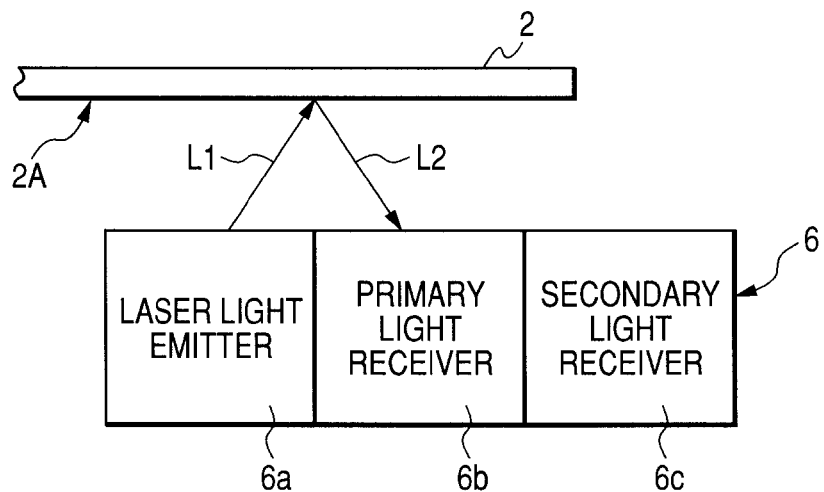
FIG. 2 is a block diagram showing the configuration of the optical pickup.

In this way, during data reproduction, the central processing unit 3 drives a spindle motor via a spindle motor driver (not shown) to rotate the optical disk 2 placed in the body of the optical recording video camcorder 1 at a constant linear velocity (CLV) or a constant angular velocity (CAV). Then, to control a laser driver 5, an automatic power control circuit 4 sets to itself a reproducing laser power setting indicative of a laser light power for reproducing data (hereinafter referred to as a reproducing laser power). The automatic power control circuit 4 then controls the laser driver 5 based on the thus set reproducing laser power setting. The laser drive 5 drives a laser light emitter 6a of an optical pickup 6 shown in FIG. 2 under the control of the automatic power control circuit 4 in order to emit laser light L1 of the reproducing laser power to the laser light emitter 6a.

The optical pickup 6 (FIG. 2) includes not only the laser light emitter 6a but also a light receiver 6b formed of an IC (Integrated Circuit) chip for generating reproduced data (hereinafter referred to as a primary light receiver) and a light receiver 6c formed of an IC chip for monitoring the laser power (hereinafter referred to as a secondary light receiver). In the optical pickup 6, the primary light receiver 6b receives reflected light L2 resulting from the laser light L1 that is emitted from the laser light emitter 6a and reflected off a recording surface 2A of the optical disk 2. The primary light receiver 6b then photoelectrically converts the thus received reflected light L2 to generate a light reception signal and sends the thus generated light reception signal to a servo computation circuit 7.

Based on the light reception signal, the servo computation circuit 7 generates a focus error signal (hereinafter referred to as an FE signal) according to, for example, the astigmatism focus error detection, a tracking error signal (hereinafter referred to as a TE signal) according to, for example, the push-pull method, and a pull-in signal (hereinafter referred to as a PI signal). The servo computation circuit 7 normalizes the FE and TE signals with respect to the PI signal, and sends the normalized FE and TE signals to a servo circuit 8. The servo computation circuit 7 also generates a reproduced RF signal based on the light reception signal and sends it to a digital signal processor (DSP) 9. Based on the FE signal, the servo circuit 8 drives an actuator (not shown) that holds an objective lens of the optical pickup 6 in order to control the focusing such that the laser light L1 is focused on the recording surface 2A of the optical disk 2. The servo circuit 8 also drives a thread motor (not shown) that moves the optical pickup 6 in the radial direction of the optical disk (seek operation) based on the TE signal in order to control the tracking such that a desired track on the recording surface 2A of the optical disk 2 is illuminated with the laser light L1. On the other hand, the digital signal processor 9 generates a reproduced data from the reproduced RF signal and sends it to the central processing unit 3.

The secondary light receiver 6c of the optical pickup 6 (FIG. 2) receives at least part of the laser light L1 emitted from the laser light emitter 6a, photoelectrically converts it to generate a light reception signal, and sends it to the automatic power control circuit 4. The automatic power control circuit 4 detects the current power of the laser light L1 emitted from the laser emitter 6a of the optical pickup 6 based on the light reception signal, and controls the laser driver 5 based on the detection result such that the laser light emitter 6a emits laser light L1 at a constant reproducing laser power. That is, the automatic power control circuit 4 sets up a feedback loop in which it acquires the light reception signal from the secondary light receiver 6c while controlling the laser driver 5, so as to drive the laser light emitter 6a of the optical pickup 6 to emit the laser light L1 at the reproducing laser power in a stable manner.

On the other hand, during data recording, the central processing unit 3 captures image data acquired by imaging a subject through an imaging unit (not shown) while rotating the optical disk 2 as in the data reproducing process described above, and sends the captured image data to the automatic power control circuit 4. To control the laser driver 5, the automatic power control circuit 4 sets to itself a recording laser power setting indicative of the value of the power of the laser light L1 for recording data (hereinafter referred to as a recording laser power). The automatic power control circuit 4 then controls the laser driver 5 based on the thus set recording laser power setting and sends the image data to the laser driver 5. The laser driver 5 drives the laser light emitter 6a of the optical pickup 6 under the control of the automatic power control circuit 4 to emit the laser light L1 at the recording laser power. The laser driver 5 also controls turning on and off of the laser light emitter 6a based on the image data in order to emit the laser light L1 and stop the firing thereof according to the image data.

In this way, the optical pickup 6 emits the laser light L1 of the recording laser power and stops the firing thereof to the recording surface 2A of the optical disk 2 according to the image data, so as to record the image data on the recording surface 2A of the optical disk. Again, the primary light receiver 6b of the optical pickup 6, as in the data reproducing process described above, receives reflected light L2 resulting from the laser light L1 reflected off the recording surface 2A of the optical disk 2, and sends the received light reception signal to the servo computation circuit 7. Accordingly, the servo computation circuit 7 generates the FE and TE signals based on the light reception signal, as in the data reproducing process described above, and sends them to the servo circuit 8 so as to control the tracking and focusing of the laser light L1 through the servo circuit 8. Also, the secondary laser light emitter 6c of the optical pickup 6 receives at least part of the laser light L1 and sends a light reception signal to the automatic power control circuit 4. Therefore, also during data recording, as in the data reproducing process described above, the automatic power control circuit 4 drives the laser light emitter 6a of the optical pickup 6 to emit the laser light L1 at the recording laser power in a stable manner.

Figure 3:
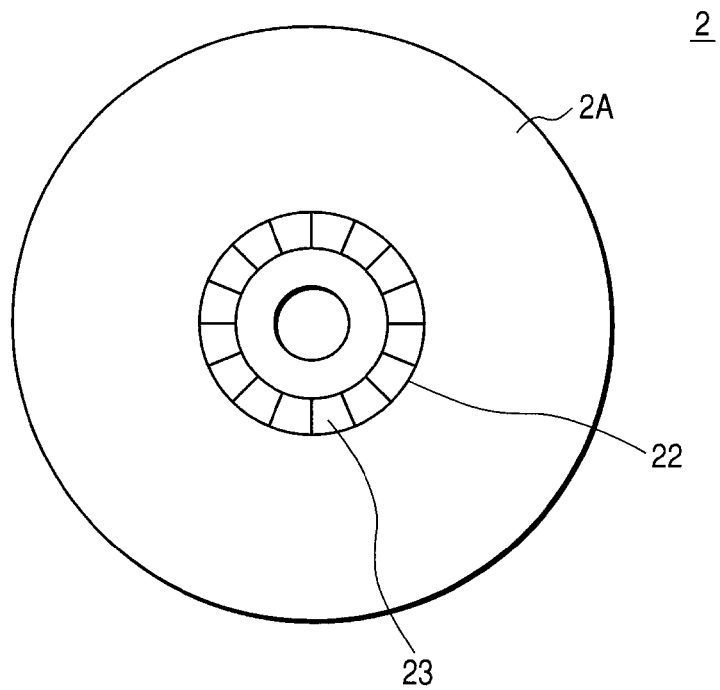
FIG. 3 is a schematic diagram for explaining the optical disk.

As shown in FIG. 3, an optimum laser power selection area 22, called a PCA (Power Calibration Area), for selecting an optimum recording laser power by writing trial write data is provided at the innermost portion of the recording surface 2A of the optical disk 2. For example, one track is assigned for the optimum laser power selection area 22. Some of optimum laser power selection areas 22 occupy a plurality of tracks depending on the format. The optimum laser power selection area 22 is divided into a plurality of successive sector-like trial write areas 23, each having a predetermined unit. A serpentine groove (not shown) is preformed on the recording surface 2A of the optical disk 2 to provide a wobble signal containing, for example, positional and temporal information on the optical disk 2. When the optical disk 2 is placed in the body, the central processing unit 3 starts an optimum laser light power selection process, called OPC (Optimum Power Control), and rotates the optical disk 2, as in the data reproducing process described above. Then, the automatic power control circuit 4 controls the laser driver 5 based on a reproducing laser power setting, so as to drive the laser light emitter 6a of the optical pickup 6 via the laser driver 5 to emit the laser light L1. The servo circuit 8 drives the thread motor (not shown) to cause the optical pickup 6 to perform a seek operation, such that the serpentine groove formed on the recording surface 2A of the optical disk 2 to provide the wobble signal is illuminated with the laser light L1. Then, the primary light receiver 6b of the optical pickup 6 receives the reflected light L2 resulting from the laser light L1 reflected off the serpentine groove on the recording surface 2A of the optical disk 2, and sends the resultant light reception signal to the servo computation circuit 7.

The servo computation circuit 7 generates a push-pull signal from the light reception signal and sends it to the digital signal processor 9. The digital signal processor 9 generates the wobble signal based on the push-pull signal. The digital signal processor 9 also generates a timing notification signal CL based on the wobble signal. In a series of processes in which trial write data is continuously written to the plurality of trial write areas 23 in the optimum laser power selection area 22 while the optical disk 2 is rotated and the optical pickup 6 is moved as appropriate in the radial direction of the optical disk 2, the timing notification signal CL formed of a rising edge from the logic level "L" to the logic level "H" indicates the timing when the laser light L1 that illuminates the recording surface 2A of the optical disk 2 sequentially reaches the trial write start positions of the plurality of trial write areas 23. Then, the digital signal processor 9 sends the timing notification signal CL to the central processing unit 3, the automatic power control circuit 4 and the servo computation circuit 7.

The central processing unit 3 pre-holds in a memory (not shown) a plurality of different trial write laser power settings (hereinafter referred to as a trial write laser power) indicative of values of the power of the laser light L1 used to write trial write data to the respective plurality of trial write areas 23 on the optical disk 2. When the optimum laser light power selection process is initiated (that is, when trial write data has not at all been written to the plurality of trial write areas 23), the central processing unit 3 reads out the first trial write laser power setting from the memory and sends it to the automatic power control circuit 4. Whenever the timing notification signal CL subsequently provided from the digital signal processor 9 rises from the logic level "L" to the logic level "H", the central processing unit 3 sequentially reads out one trial write laser power setting at a time from the memory at the timing of the rising edge (hereinafter referred to as a laser light arrival timing) and sends the trial write laser power setting to the automatic power control circuit 4. In this way, the central processing unit 3 sends different trial write laser power settings for each trial write area 23, used to write trial write data to the respective plurality of trial write areas 23 on the optical disk 2, to the automatic power control circuit 4 before the trial write data is actually written to each of the trial write areas 23. The central processing unit 3 also sends the trial write data to the automatic power control circuit 4 along with, for example, the first trial write laser power setting.

The automatic power control circuit 4 includes a first register (hereinafter referred to as a pre-store register) that pre-stores a trial write laser power setting used to write trial write data to a trial write area 23, and a second register (hereinafter referred to as a setting-store register) that stores and sets a trial write laser power setting used to write trial write data to a trial write area 23. The automatic power control circuit 4 stores a trial write laser power setting in the pre-store register, which is used to write trial write data at the trial write start position of the trial write area 23 to which the laser light L1 will move from its current illumination position on the recording surface 2A of the optical disk 2. The automatic power control circuit 4 moves the trial write laser power setting temporarily stored in the pre-store register to the setting-store register, so that the setting-store register stores the trial write laser power setting used to write the trial write data to the trial write area 23, which is currently illuminated with the laser light L1, on the recording surface 2A of the optical disk 2.

That is, as shown in FIG. 4, the automatic power control circuit 4 first stores the first trial write laser power setting Pa in the pre-store register, which is provided from the central processing unit 3 when the optimum laser light power selection process is initiated (that is, when trial write data has not at all been written to the plurality of trial write areas 23) ((C) in FIG. 4). When laser light arrival timing is notified by the timing notification signal CL subsequently provided from the digital signal processor 9 ((A) and (B) in FIG. 4), the automatic power control circuit 4 moves the trial write laser power setting Pa already stored in the pre-store register to the setting-store register and stores it therein, so as to set the trial write laser power setting Pa to the automatic power control circuit 4 itself to be used to control the laser driver 5 ((D) in FIG. 4). Then, the automatic power control circuit 4 controls the laser driver 5 based on the trial write laser power setting Pa, and stores a trial write laser power setting Pb newly provided from the central processing unit 3 in the pre-store register ((C) in FIG. 4). When the automatic power control circuit 4 controls the laser driver 5 based on the trial write laser power setting Pa, the automatic power control circuit 4 sends trial write data provided from the central processing unit 3 to the laser driver 5.

In this way, whenever the laser light arrival timing is notified by the timing notification signal CL ((A) and (B) in FIG. 4), the automatic power control circuit 4 moves the trial write laser power settings Pb to Pg pre-stored in the pre-store registers to the setting-store registers and stores them therein, so as to switch the trial write laser power settings Pa to Pf stored in the setting-store registers until then to the trial write laser power settings Pb to Pg newly stored in the setting-store registers to set the trial write laser power settings Pb to Pg to be used to control the laser driver 5 ((D) in FIG. 4). Then, the automatic power control circuit 4 controls the laser driver 5 based on the trial write laser power settings Pb to Pg, and stores trial write laser power settings Pc to Pg in the pre-store registers, which are used to write trial write data to the following trial write areas 23 ((B) in FIG. 4). When the laser light arrival timing is notified by the timing notification signal CL ((A) and (B) in FIG. 4), although the automatic power control circuit 4 moves the trial write laser power settings Pb to Pg pre-stored in the pre-store registers to the setting-store registers and stores them therein, so as to switch from the trial write laser power settings Pa to Pf stored in the setting-store registers until then to the trial write laser power settings Pb to Pg newly stored in the setting-store registers to set the trial write laser power settings Pb to Pg to be used to control the laser driver 5 ((D) in FIG. 4), and controls the laser driver 5 based on the trial write laser power settings Pb to Pg, the automatic power control circuit 4 does not store any setting in the pre-store register if no new trial write laser power setting is provided from the central processing unit 3 ((B) in FIG. 4). The automatic power control circuit 4 sends trial write data to the laser driver 5 whenever the automatic power control circuit 4 switches the trial write laser power settings Pb to Pg to control the laser driver 5.

Therefore, whenever the illumination position of the laser light L1 reaches the trial write start position of a trial write area 23 on the recording surface 2A of the optical disk 2, the laser driver 5, which drives the laser light emitter 6a of the optical pickup 6 to emit the laser light L1, switches the power of the laser light L1 to be emitted from the laser light emitter 6a to the trial write laser power corresponding to that trial write area 23 in response to the switching of the control performed in the automatic power control circuit 4. When the trial write area 23 on the optical disk 2 is to be illuminated with the laser light L1, the laser driver 5 drives the laser light emitter 6a to emit the laser light L1 and stops the firing thereof by controlling the activation and inactivation of the laser light emitter 6a based on the trial write data provided from the automatic power control circuit 4. Thus, under the control of the laser driver 5, a plurality of trial write areas 23 on the optical disk 2 can be illuminated with the laser light L1 of different trial write laser powers, allowing the trial write data to be written.

In the optical recording video camcorder 1, as the size of the optical pickup 6 becomes smaller, the primary light receiver 6b receives not only the reflected light L2 resulting from the laser light L1 emitted from the laser light emitter 6a and reflected off the recording surface 2A of the optical disk 2, but also stray light, such as diffracted light and scattered light of the laser light L1, generated in the emitter-to-disk path in the optical pickup 6. Therefore, the primary light receiver 6b also photoelectrically converts the emitter-to-disk path stray light when the recording surface 2A of the optical disk 2 is being illuminated with the laser light L1, generates a light reception signal containing a resultant error signal, and sends it to the servo computation circuit 7. Accordingly, when the servo computation circuit 7 receives the light reception signal from the primary light receiver 6b of the optical pickup 6 and simply generates a PI signal based on the light reception signal, the PI signal thus generated contains an offset corresponding to the error signal contained in the light reception signal, so that the FE and TE signals will be affected by the offset. Such an offset contained in the PI signal varies depending on the power of the laser light L1 emitted from the laser light emitter 6a of the optical pickup 6.

Therefore, the central processing unit 3 pre-holds offset correction values corresponding to reproducing laser powers and recording laser powers in a memory (not shown) and sends the offset correction values to the servo computation circuit 7 during data reproduction and data recording. In this way, during the data reproduction and data recording, the servo computation circuit 7 generates an offset-free PI signal based on the offset correction value and the light reception signal containing the error signal provided from the optical pickup 6.

Furthermore, the servo computation circuit 7 generates the FE signal, TE signal and PI signal based on the light reception result obtained from the primary light receiver 6b of the optical pickup 6 during successive writing of trial write data to the plurality of trial write areas 23 on the optical disk 2, normalizes the FE and TE signals with respect to the PI signal, and then sends them to the servo circuit 8, allowing the servo circuit 8 to perform focusing and tracking control. As the trial write laser power is changed for each of the trial write areas 23 when trial write data is written to the plurality of trial write areas 23 on the optical disk 2, the central processing unit 3 also pre-holds a plurality of different offset correction values corresponding to the plurality of different trial write laser powers in the memory (not shown) in a one-to-one relationship. Thus, when the optimum laser light power selection process is initiated (that is, when trial write data has not at all been written to the plurality of trial write areas 23), the central processing unit 3 first reads out the first offset correction value from the memory and sends it to the servo computation circuit 7. Whenever laser light arrival timing is notified by the timing notification signal CL subsequently provided from the digital signal processor 9, the central processing unit 3 sequentially reads out one offset correction value at a time from the memory and sends it to the servo computation circuit 7. In this way, the central processing unit 3 sends different offset correction values for each trial write area 23, which are used to write trial write data to the respective plurality of trial write areas 23 on the optical disk 2, to the servo computation circuit 7 before the trial write data is actually written to each of the trial write areas 23.

The servo computation circuit 7 includes a first register (hereinafter referred to as a pre-store register) that pre-stores an offset correction value used to remove, from the PI signal generated based on a light reception signal provided from the primary light receiver 6b of the optical pickup 6, an offset according to an error signal contained in the light reception signal, and a second register (hereinafter referred to as a setting-store register) that stores and sets an offset correction value used to remove the offset from the PI signal generated based on the light reception signal provided from the primary light receiver 6b when trial write data is being written to a trial write area 23. When trial write data is written to a trial write area 23, the servo computation circuit 7 stores an offset correction in the pre-store register value, which is used to write the trial write data to the trial write area 23 at the trial write start position to which the laser light L1 will move from its current illumination position on the recording surface 2A of the optical disk 2. The servo computation circuit 7 moves the offset correction value temporarily stored in the pre-store register to the setting-store register, so that the setting-store register stores the offset correction value used to write the trial write data to the trial write area 23, which is currently illuminated with the laser light L1, on the recording surface 2A of the optical disk 2.

That is, as described above in the trial write laser power modification process shown in (A) to (D) in FIG. 4, the servo computation circuit 7 first stores the first offset correction value in the pre-store register, which is provided from the central processing unit 3 when the optimum laser light power selection process is initiated (that is, when trial write data has not at all been written to the plurality of trial write areas 23). When laser light arrival timing is notified by the timing notification signal CL subsequently provided from the digital signal processor 9, the servo computation circuit 7 moves the offset correction value already stored in the pre-store register to the setting-store register and stores it therein, so as to set the offset correction value to the servo computation circuit 7 itself to be used to remove the offset from the PI signal. The servo computation circuit 7 also stores an offset correction value newly provided from the central processing unit 3 in the pre-store register.

In this way, whenever the laser light arrival timing is notified by the timing notification signal CL, the servo computation circuit 7 moves the offset correction value pre-stored in the pre-store register to the setting-store register and stores it therein, so as to switch from the offset correction value stored in the setting-store register until then to the offset correction value newly stored in the setting-store register to set the new offset correction value to be used to remove the offset from the PI signal. The servo computation circuit 7 also stores an offset correction value in the pre-store registers, which is used to remove the offset from the PI signal when trial write data is written to the following trial write areas 23. When the laser light arrival timing is notified by the timing notification signal CL, although the servo computation circuit 7 moves the offset correction value pre-stored in the pre-store registers to the setting-store registers and stores it therein, so as to switch from the offset correction value stored in the setting-store registers until then to the offset correction value newly stored in the setting-store register to set the new offset correction value to be used to remove the offset from the PI signal, the servo computation circuit 7 does not store any value in the pre-store register if no new offset correction value is provided from the central processing unit 3.

Therefore, although the servo computation circuit 7 generates the PI signal based on the light reception result obtained from the primary light receiver 6b of the optical pickup 6 when the recording surface 2A of the optical disk 2 is being illuminated with the laser light L1, whenever the illumination position of the laser light L1 reaches the trial write start position of a trial write area 23 on the recording surface 2A of the optical disk 2, the servo computation circuit 7 switches the offset correction value used to remove the offset from the PI signal in response to the switching of the trial write laser power, and uses the current light reception signal containing an error signal provided from the primary light receiver 6b of the optical pickup 6 as well as the offset correction value corresponding to the current trial write laser power of the laser light L1 for writing trial write data, so as to generate an offset-free PI signal.

When the optical disk 2 is placed in the body of the optical recording video camcorder 1, the optical recording video camcorder 1 initiates a trial write process procedure RT1 as part of the optimum laser light power selection process shown in FIG. 5 and proceeds to step SP1.

In step SP1, the automatic power control circuit 4 drives the laser light emitter 6a of the optical pickup 6 via the laser driver 5 to emit the laser light L1 from the laser light emitter 6a and illuminate the recording surface 2A of the optical disk 2. Then, in step SP2, the central processing unit 3 sends the first trial write laser power setting to the automatic power control circuit 4 and also sends an offset correction value to the servo computation circuit 7. The automatic power control circuit 4 stores the received trial write laser power setting in the pre-store register and the servo computation circuit 7 stores the received offset correction value in the pre-store register. The digital signal processor 9 receives a light reception signal via the servo computation circuit 7, as a push-pull signal, generated by the primary light receiver 6b of the optical pickup 6, and generates a wobble signal from the push-pull signal. The digital signal processor 9 also generates a timing notification signal CL based on the wobble signal, and sends the timing notification signal CL to the central processing unit 3, the automatic power control circuit 4 and the servo computation circuit 7.

Subsequently, in step SP3, whenever laser arrival timing is notified by the timing notification signal CL, the central processing unit 3 sends a trial write laser power setting to the automatic power control circuit 4. Whenever the laser arrival timing is notified by the timing notification signal CL, the automatic power control circuit 4 moves the trial write laser power setting stored in the pre-store register at the last laser arrival timing to the setting-store register and stores it therein, so as to set the trial write laser power setting. The automatic power control circuit 4 also stores a trial write laser power setting in the pre-store register, which is provided from the central processing unit 3 and used to write trial write data to the next trial write area 23. In this way, whenever laser arrival timing is notified, the automatic power control circuit 4 drives the laser light emitter 6a of the optical pickup 6 via the laser driver 5 to emit the laser light L1 of a trial write laser power according to the trial write laser power setting set at the laser arrival timing and illuminate the current trial write area 23 to which trial write data is written.

In step SP4, which is simultaneously carried out with the step SP3, whenever laser arrival timing is notified by the timing notification signal CL, the central processing unit 3 sends an offset correction value to the servo computation circuit 7. Whenever the laser arrival timing is notified by the timing notification signal CL, the servo computation circuit 7 moves the offset correction value stored in the pre-store register at the last laser arrival timing to the setting-store register and stores it therein, so as to set the offset correction value. The servo computation circuit 7 also stores an offset correction value in the pre-store register, which is provided from the central processing unit 3 and used to write trial write data to the next trial write area 23. In this way, whenever laser arrival timing is notified, the servo computation circuit 7 generates an offset-free PI signal based on the offset correction value set at the laser arrival timing and the light reception signal concurrently provided from the primary light receiver 6b of the optical pickup 6.

In step SP5, the central processing unit 3 determines whether or not the trial write data has been written to the plurality of trial write areas 23 on the optical disk 2 based on the timing notification signal CL provided from the digital signal processor 9. If the trial write data is still being written and the central processing unit 3 receives a "No" result, it returns to steps of SP3 and SP4. On the other hand, if the trial write data has been written to the plurality of trial write areas 23 on the optical disk 2 and the central processing unit 3 receives a "Yes" result, it proceeds to step SP6 and terminates the trial write process procedure RT1. When the central processing unit 3 terminates the trial write process procedure RT1, the central processing unit 3, as in the above data reproducing process, subsequently illuminates the plurality of trial write areas 23 with the laser light L1 of a reproducing laser power to sequentially read out the thus written trial write data from the trial write areas 23, and compares the thus read out trial write data with, for example, the pre-recorded trial write data. Then, the central processing unit 3 selects an optimum power of the laser light L1 for data recording based on the comparison result.

During the optimum laser light power selection process, the optical recording video camcorder 1 configured as described above drives the laser light emitter 6a of the optical pickup 6 to emit the laser light L1 to illuminate the recording surface 2A of the optical disk 2, and uses the primary light receiver 6b to receive the reflected light L2 resulting from the laser light L1 reflected off the recording surface 2A. Then, the optical recording video camcorder 1 generates a timing notification signal CL based on the resultant light reception signal and sends the thus generated timing notification signal CL to the central processing unit 3, the automatic power control circuit 4 and the servo computation circuit 7. Whenever laser arrival timing is notified by the timing notification signal CL, the central processing unit 3 sends a trial write laser power setting to the automatic power control circuit 4 and also sends an offset correction value to the servo computation circuit 7.

Whenever laser arrival timing is notified by the timing notification signal CL, the automatic power control circuit 4 moves the trial write laser power setting stored in the pre-store register at the last laser arrival timing to the setting-store register and stores it therein, so as to set the trial write laser power setting. The automatic power control circuit 4 also stores a trial write laser power setting in the pre-store register, which is provided from the central processing unit 3 and used to write trial write data to the next trial write area 23. In this way, whenever laser arrival timing is notified, the automatic power control circuit 4 drives the laser light emitter 6*a* of the optical pickup 6 via the laser driver 5 to emit the laser light L1 of a trial write laser power according to the trial write laser power setting set at the laser arrival timing and illuminate the current trial write area 23 to which trial write data is written.

On the other hand, whenever laser arrival timing is notified by the timing notification signal CL, the servo computation circuit 7 moves the offset correction value stored in the pre-store register at the last laser arrival timing to the setting-store register and stores it therein, so as to set the offset correction value. The servo computation circuit 7 also stores an offset correction value in the pre-store register, which is provided from the central processing unit 3 and used to write trial write data to the next trial write area 23. In this way, whenever laser arrival timing is notified, the servo computation circuit 7 generates an offset-free PI signal based on the offset correction value set at the laser arrival timing as well as the light reception signal concurrently generated in the primary light receiver 6*b* of the optical pickup 6 by illuminating the trial write area 23 with the laser light L1 to write trial write data.

Accordingly, in the optical recording video camcorder 1, whenever the laser light L1 sequentially reaches trial write start positions of the plurality of trial write areas 23 provided on the recording surface 2A of the optical disk 2, the automatic power control circuit 4 switches and sets the trial write laser power setting, and controls the power of the laser light L1 emitted from the optical pickup based on the thus set trial write laser power setting, so that at the laser arrival timing when the laser light L1 reaches each of the trial write start positions of the plurality of trial write areas 23, the power of the laser light L1 is switched to the power corresponding to the trial write area 23 at the trial write start position, allowing trial write data to be written to the trial write area 23. Also, in the optical recording video camcorder 1, the servo computation circuit 7 switches and sets the offset correction value at the laser arrival timing when the laser light L1 sequentially reaches the trial write start positions of the plurality of trial write areas 23 provided on the recording surface 2A of the optical disk 2, and generates an offset-free PI signal based on the thus set offset correction value and the light reception signal generated in the primary light receiver 6*b* of the optical pickup 6 by illuminating the trial write area 23 with the laser light L1 to write the trial write data, so that during the writing of the trial write data from the trial write start position to the trial write end position of the trial write area 23, focusing and tracking of the laser light L1 can be accurately controlled based on offset-free FE and TE signals normalized with respect to the offset-free PI signal.

As described above, the optical recording video camcorder 1 is configured to, during the optimum laser light power selection process, drive the laser light emitter 6*a* of the optical pickup 6 to emit the laser light L1 and illuminate the recording surface 2A of the optical disk 2, use the primary light receiver 6*b* to receive the reflected light L2 resulting from the laser light L1 reflected off the recording surface 2A, generate a timing notification signal CL based on the resultant light reception signal, switch and set a trial write laser power setting whenever laser arrival timing is notified by the thus generated timing notification signal CL, and control the power of the laser light L1 emitted from the laser light emitter 6*a* of the optical pickup 6 based on the thus set trial write laser power setting. In this way, at the laser arrival timing when the laser light L1 reaches each of the trial write start positions of the plurality of trial write areas 23, the optical recording video camcorder 1 can switch the power of the laser light L1 to the power corresponding to the trial write area 23 at the trial write start position and write the trial write data to the trial write area 23, allowing the trial write areas 23 to be effectively used to write the trial write data.

The optical recording video camcorder 1 is also configured to, during the optimum laser light power selection process, drive the laser light emitter 6*a* of the optical pickup 6 to emit the laser light L1 and illuminate the recording surface 2A of the optical disk 2, use the primary light receiver 6*b* to receive the reflected light L2 resulting from the laser light L1 reflected off the recording surface 2A, generate a timing notification signal CL based on the resultant light reception signal, switch and set an offset correction value whenever laser arrival timing is notified by the thus generated timing notification signal CL, and generate an offset-free PI signal based on the thus set trial offset correction value and the light reception signal generated in the primary light receiver 6*b* of the optical pickup 6 by illuminating the trial write area 23 with the laser light L1 to write trial write data. In this way, during the writing of the trial write data from the trial write start position to the trial write end position of the trial write area 23, the optical recording video camcorder 1 can accurately control focusing and tracking of the laser light L1 based on offset-free FE and TE signals normalized with respect to the offset-free PI signal, allowing the trial write data to be accurately written to the plurality of trial write areas 23 provided on the recording surface 2A of the optical disk 2. Since the plurality of trial write areas 23 provided on the recording surface 2A of the optical disk 2 are effectively used to accurately write the trial write data, the optical recording video camcorder 1 can accurately select an optimum power of the laser light L1 during data recording based on the trial write data written on the plurality of trial write areas 23.

Furthermore, in the optical recording video camcorder 1, during the optimum laser light power selection process, the central processing unit 3 sends a trial write laser power setting to the automatic power control circuit 4 and also sends an offset correction value to the servo computation circuit 7, whenever laser arrival timing is notified by the timing notification signal CL. Also, in the optical recording video camcorder 1, whenever the laser arrival timing is notified by the timing notification signal CL, the automatic power control circuit 4 moves the trial write laser power setting stored in the pre-store register at the last laser arrival timing to the setting-store register and stores it therein, so as to set the trial write laser power setting. The automatic power control circuit 4 also stores a trial write laser power setting in the pre-store register, which is provided from the central processing unit 3 and used to write trial write data to the next trial write area 23. Also, in the optical recording video camcorder 1, whenever the laser arrival timing is notified by the timing notification signal CL, the servo computation circuit 7 moves the offset correction value stored in the pre-store register at the last laser arrival timing to the setting-store register and stores it therein, so as to set the offset correction value. The servo computation circuit 7 also stores an offset correction value in the pre-store register, which is provided from the central processing unit 3 and used to write the trial write data to the next trial write area 23. Accordingly, before the laser light L1 reaches the trial write start position of the trial write area 23, the optical video camcorder 1 can reliably holds the trial write laser power setting and offset correction value for the automatic power control circuit 4 and the servo computation circuit 7, which are used to write the trial write data to the trial write area 23 starting from the trial write start position. This prevents the trial write area 23 from being ineffectively used and the trial write data from being inaccurately written in case the trial write laser power setting and offset correction value are not ready when the laser light L1 reaches the trial write start position. Furthermore, in the optical recording video camcorder 1, setting and holding of a trial write laser power setting are done almost simultaneously with the setting and holding an offset correction value, thereby preventing increased process loads on the central processing unit 3, the automatic power control circuit 4 and the servo computation circuit 7 during the writing of trial write data to a trial write area 23.

In the above embodiment, although the description has been given to the case where during the optimum laser light power selection process, the servo computation circuit 7 generates an offset-free PI signal based on an offset correction value set to the servo computation circuit 7 itself and a light reception signal provided from the primary light receiver 6b of the optical pickup 6, the invention is not limited thereto. For example, during the optimum laser light power selection process, the servo computation circuit 7 may generate offset-free FE, TE and PI signals based on the offset correction value set to the servo computation circuit 7 itself and the light reception signal provided from the primary light receiver 6b of the optical pickup 6.

In the above embodiment, although the description has been given to the case where during the optimum laser light power selection process, the power of the laser light L1 is controlled and an offset-free PI signal is generated, the invention is not limited thereto. For example, when the optical recording video camcorder 1 is provided with an optical pickup in which no emitter-to-disk path stray light is generated, only the power of the laser light L1 is controlled but an offset-free PI signal is not particularly generated during the optimum laser light power selection process.

In the above embodiment, although the description has been given to the case where during the optimum laser light power selection process, whenever laser arrival timing is notified by the timing notification signal CL, the central processing unit 3 sends a trial write laser power setting to the automatic power control circuit 4 and also sends an offset correction value to the servo computation circuit 7, the invention is not limited thereto. For example, the automatic power control circuit 4 may pre-hold a plurality of different trial write laser power settings and the servo computation circuit 7 may pre-hold a plurality of different offset correction values. In this way, the process load on the central processing unit 3 can be significantly reduced during the optimum laser light power selection process.

In the above embodiment, although the description has been given to the case where the timing notification signal CL is generated based on the wobble signal, the invention is not limited thereto. For example, the timing notification signal may be generated based on a signal reproduced from a land pre pit (LPP) formed on the recording surface of the optical disk.

In the above embodiment, although the description has been given to the case where trial write data is successively written to a plurality of successive trial write areas 23 provided on the recording surface 2A of the optical disk 2, the invention is not limited thereto. For example, the trial write data may be written to a plurality of trial write areas scattered on the recording surface 2A of the optical disk 2.

In the above embodiment, although the description has been given to the case where the optical disk recording apparatus according to the embodiment of the invention is applied to the optical recording video camcorder 1 described above with reference to FIGS. 1 to 5, the invention is not limited thereto. For example, the optical disk recording apparatus according to the embodiment of the invention may be applied to a wide variety of other optical disk recording apparatuses, such as a desktop DVD recorder.

In the above embodiment, although the description has been given to the case where the automatic power control circuit 4 described above with reference to FIGS. 1 to 5 is applied as a laser power controller that sets a laser power setting and controls the laser light power emitted from the optical pickup based on the thus set laser power setting, the invention is not limited thereto. For example, a wide variety of other laser power controllers can be applied, such as a laser power controller formed by integrating the automatic power control circuit 4 and the laser driver 5.

In the above embodiment, although the description has been given to the case where the digital signal processor 9 described above with reference to FIGS. 1 to 5 is applied as a signal generator that, when a plurality of trial write areas provided on the recording surface of the optical disk are successively illuminated with laser light in order to write trial write data, generates a timing notification signal for notifying laser arrival timing when the laser light sequentially reaches trial write start positions of the plurality of trial write areas based on a light reception signal generated by the optical pickup, the invention is not limited thereto. For example, a wide variety of other signal generators can be applied, such as a hardware-based signal generation circuit that, when a plurality of trial write areas provided on the recording surface of the optical disk are successively illuminated with laser light in order to write trial write data, generates a timing notification signal for notifying laser arrival timing when the laser light sequentially reaches trial write start positions of the plurality of trial write areas based on a light reception signal generated by the optical pickup.

In the above embodiment, although the description has been given to the case where the servo computation circuit 7 described above with reference to FIGS. 1 to 5 is applied as a servo signal generator that, when a plurality of trial write areas provided on the recording surface of the optical disk are successively illuminated with laser light in order to write trial write data, sets an offset correction value for removing an offset according to an error signal contained in a light reception signal generated by the optical pickup, and generates an offset-free servo signal based on the thus set offset correction value and the light reception signal generated by the optical pickup, the invention is not limited thereto. For example, a wide variety of other servo signal generators can be applied, such as a hardware-based servo signal generation circuit that, when a plurality of trial write areas provided on the recording surface of the optical disk are successively illuminated with laser light in order to write trial write data, sets an offset correction value for removing an offset according to an error signal contained in a light reception signal generated by the optical pickup, and generates an offset-free servo signal based on the thus set offset correction value and the light reception signal generated by the optical pickup.

In the above embodiment, although the description has been given to the case where the central processing unit 3 described above with reference to FIGS. 1 to 5 is applied as a power setting sender that, whenever laser arrival timing is notified by the timing notification signal provided from the signal generator, sends a laser power setting to the laser power controller, which is used to write trial write data to the trial write area at the trial write start position to which the laser light will move from its current trial write start position where the laser light reached at the notified laser arrival timing, the invention is not limited thereto. For example, a wide variety of other power setting senders can be applied, such as a hardware-based power setting sending circuit that, whenever laser arrival timing is notified by the timing notification signal provided from the signal generator, sends a laser power setting to the laser power controller, which is used to write trial write data to the trial write area at the trial write start position to which the laser light will move from its current trial write start position where the laser light reached at the notified laser arrival timing.

In the above embodiment, although the description has been given to the case where the central processing unit 3 described above with reference to FIGS. 1 to 5 is applied as a correction value sender that, whenever laser arrival timing is notified by the timing notification signal provided from the signal generator, sends an offset correction value to the servo signal generator, which is used to write trial write data to the trial write area at the trial write start position to which the laser light will move from its current trial write start position where the laser light reached at the notified laser arrival timing, the invention is not limited thereto. For example, a wide variety of other correction value senders can be applied, such as a hardware-based correction value sending circuit that, whenever laser arrival timing is notified by the timing notification signal provided from the signal generator, sends an offset correction value to the servo signal generator, which is used to write trial write data to the trial write area at the trial write start position to which the laser light will move from its current trial write start position where the laser light reached at the notified laser arrival timing.

The invention can be applied to an optical disk recording apparatus, such as an optical recording video camcorder that uses laser light to write data to an optical disk.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk recording apparatus comprising:
   an optical pickup that emits laser light to illuminate a recording surface of an optical disk, receives reflected light resulting from the laser light reflected off the recording surface, and generates a light reception signal based on the thus received reflected light;
   a laser power controller that sets a laser power setting and controls the power of the laser light emitted from the optical pickup based on the thus set laser power setting;
   a signal generator that, when a plurality of trial write areas provided on the recording surface of the optical disk are successively illuminated with the laser light in order to write trial write data, generates a timing notification signal that sets laser arrival timing when the laser light sequentially reaches trial write start positions of the plurality of trial write areas based on the light reception signal generated by the optical pickup;
   a power setting sender that, whenever the laser arrival timing is set by the timing notification signal provided from the signal generator, sends the laser power setting to the laser power controller, the laser power setting used to write the trial write data to the trial write area at the trial write start position to which the laser light will move from its current trial write start position where the laser light reached at the notified laser arrival timing; and
   a correction value sender that, whenever the laser arrival timing is set by the timing notification signal provided from the signal generator, sends an offset correction value to the servo signal generator, the offset correction value used to write the trial write data to the trial write area at the trial write start position to which the laser light will move from its current trial write start position where the laser light reached at the set laser arrival timing,
   wherein,
   when the laser arrival timing is set by the timing notification signal provided from the signal generator, the laser power controller switches and sets the laser power setting held in the laser power controller itself, and controls the power of the laser light emitted from the optical pickup based on the thus set laser power setting,
   whenever the laser arrival timing is notified by the timing set signal provided from the signal generator, the laser power controller holds the laser power setting provided from the power setting sender, sets the laser power setting that was provided from the power setting sender when the last laser arrival timing was set and held in the laser power controller, and controls the power of the laser light emitted from the optical pickup based on the thus set laser power setting, and
   whenever the laser arrival timing is set by the timing notification signal provided from the signal generator, the servo signal generator holds the offset correction value provided from the correction value sender, sets the offset correction value that was provided from the correction value sender when the last laser arrival timing was set and held in the servo signal generator, and generates the offset-free servo signal based on the thus set offset correction value and the light reception signal generated by the optical pickup.

2. The optical disk recording apparatus according to claim 1, further comprising a servo signal generator that, when the plurality of trial write areas provided on the recording surface of the optical disk are successively illuminated with the laser light in order to write the trial write data, sets an offset correction value for removing an offset according to an error signal contained in the light reception signal generated by the optical pickup and generates an offset-free servo signal based on the thus set offset correction value and the light reception signal generated by the optical pickup,
   wherein,
   when the laser arrival timing is notified by the timing notification signal provided from the signal generator, the servo signal generator generates switches and sets the offset correction value held in the servo signal generator itself, and generates the offset-free servo signal based on the thus set the offset correction value and the light reception signal generated by the optical pickup.

3. An optical recording method comprising the steps of:
   using an optical pickup to emit laser light to illuminate a recording surface of an optical disk, receive reflected light resulting from the laser light reflected off the recording surface, and generate a light reception signal based on the thus received reflected light;
   when a plurality of trial write areas provided on the recording surface of the optical disk are successively illuminated with the laser light in order to write trial write data, generating a timing notification signal that sets laser arrival timing when the laser light sequentially reaches trial write start positions of the plurality of trial write areas based on the light reception signal generated by the optical pickup;

when the laser arrival timing is set by the timing notification signal, switching and setting a laser power setting, and controlling the power of the laser light emitted from the optical pickup based on the thus set laser power setting;

whenever the laser arrival timing is set by the timing notification signal provided from the signal generator, sending the laser power setting from a power setting sender to the laser power controller, the laser power setting used to write the trial write data to the trial write area at the trial write start position to which the laser light will move from its current trial write start position where the laser light reached at the notified laser arrival timing;

whenever the laser arrival timing is set by the timing notification signal provided from the signal generator, sending an offset correction value from a correction value sender to the servo signal generator, the offset correction value used to write the trial write data to the trial write area at the trial write start position to which the laser light will move from its current trial write start position where the laser light reached at the set laser arrival timing, whenever the laser arrival timing is notified by the timing set signal provided from the signal generator, using the laser power controller to hold the laser power setting provided from the power setting sender, set the laser power setting that was provided from the power setting sender when the last laser arrival timing was set and held in the laser power controller, and control the power of the laser light emitted from the optical pickup based on the thus set laser power setting; and whenever the laser arrival timing is set by the timing notification signal provided from the signal generator, using the servo signal generator to hold the offset correction value provided from the correction value sender, set the offset correction value that was provided from the correction value sender when the last laser arrival timing was set and held in the servo signal generator, and generate the offset-free servo signal based on the thus set offset correction value and the light reception signal generated by the optical pickup.

\* \* \* \* \*